INVENTOR.
ALEX KUNEVICIUS
BY Bosworth, Sessions,
Herrstrom & Cain
ATTORNEYS

United States Patent Office
3,606,431
Patented Sept. 20, 1971

3,606,431
VIBRATION ABSORBING MOLDING RETAINER CLIP
Alex Kunevicius, Independence, Ohio, assignor to Custom Trim Products, Inc., Cleveland, Ohio
Continuation-in-part of application Ser. No. 601,473, Dec. 13, 1966, now Patent No. 3,439,950, and a division of application Ser. No. 752,578, Aug. 14, 1968, which is a continuation-in-part of said application Ser. No. 601,473, which in turn is a continuation-in-part of application Ser. No. 477,273, Aug. 4, 1965. This application Feb. 24, 1970, Ser. No. 14,086
Int. Cl. B60j 11/00; B60r 19/08; E04f 19/02
U.S. Cl. 293—1
24 Claims

ABSTRACT OF THE DISCLOSURE

A cushioning clip for retaining metal and other moldings on vehicles and other surfaces which is self adhering, resists dislodgment due to vibration, shock, and the like, and obviates the need to puncture or otherwise provide apertures in the surface for the fasteners or holders which retain the molding in place.

CROSS-REFERENCE TO RELATED APPLICATIONS

This application is a division of applicant's copending application Ser. No. 752,578 filed Aug. 14, 1968, which, in turn, was a continuation-in-part of applicant's co-pending application Ser. No. 601,473 filed Dec. 13, 1966, row U.S. Pat. No. 3,439,950 which, in turn, was a continuation-in-part of then co-pending application Ser. No. 477,273 filed Aug. 4, 1965, now abandoned.

BACKGROUND OF THE INVENTION

Field of the invention

This invention relates to means for mounting a metal or other decorative molding on automobiles, or other motor vehicles or surfaces.

Description of the prior art

For many years decorative metal feature or molding strips have been used on the sides of automobiles and other vehicles. Such strips usually extend from the front of the vehicle across the front fender or quarter panel, across the door or doors, as the case may be, and then across the rear fender or quarter panel. Such moldings or strips are formed in separate pieces for each portion (quarter panel or door) of the vehicle upon which these are mounted (they cross) and, also, frequently have multiple pieces on at least one portion of the vehicle, quarter panel and/or door, in order to provide for curves or other decorative effects. At one time, such moldings were, in part, functional in that they covered seams or joints in the vehicle body but now they are usually entirely decorative in purpose and function.

Such moldings were traditionally fastened into position by preformed wire spring clips having a head portion which engaged under flanges of the molding and two legs which extended therefrom through apertures in the body of the vehicle, which were springlike and braced away from each other and which were bulged in opposite directions away from each other to catch behind the vehicle body after being pressed together and pushed through the said aperture.

Subsequently, plastic clips of nylon or other suitable material were developed. But these, too, required holes or apertures in the vehicle body through which a depending portion of the clip could be forced and would then expand adjacent the hole and behind the body to hold the molding in position. The holes or apertures through which the clips extended had to be accurately formed and positioned, necessitating extra die and production costs, and they naturally created weakened or open areas at which rust, deterioration, salt, and the like, could more easily attack and destroy the vehicle body.

SUMMARY OF THE INVENTION

This invention comprises and has the object of providing a new and improved clip for holding metal or other types of rigid molding strips on automobiles and other vehicles and surfaces.

A further object of this invention is to provide a new and improved clip for holding metal moldings, and the like, which does not require a hole, aperture or other puncture in the body or surface upon which the molding is mounted in order to hold the molding in place; which is safe to use and install; which may be applied by unskilled labor; which eliminates the need for jigs or fixtures for forming holes for fasteners; which leaves the surface upon which it mounts the molding imperforate; which is economically manufactured; which has a new and improved co-action with the molding for engaging and holding the same; which resists dislodgment and loosening from the vehicle body or other surface because of vibration, temperature changes and the like; which holds and secures the molding and remains interengaged therewith even though and as the same contracts and expands due to temperature changes; which permits water and the like to flow under the molding without deleterious effect; and which does not adversely effect the decorative effect of the molding.

A still further object of this invention is to provide a new and improved clip for mounting decorative metal and rigid moldings and the like on vehicles and other surfaces which obtains one or more of the objects and advantages set forth above.

These and other objects and advantages of this invention will appear from the following description of preferred forms thereof.

DESCRIPTION OF THE PREFERRED EMBODIMENTS

Figure 1:
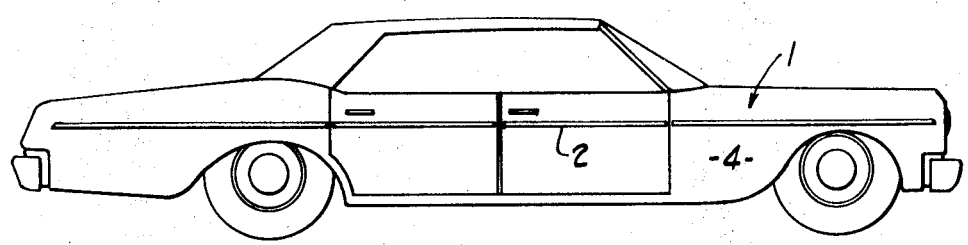
FIG. 1 is a side view of an automobile having a molding strip mounted thereon by a clip embodying a preferred form of this invention.

A clip or holding device embodying this invention is indicated generally at 1, FIG. 1, and is shown together with a molding 2 which is held or mounted thereby and an automobile 4 upon which it holds or mounts the molding 2. The automobile 4 is representative of the surface upon which the clip 1 is particularly adapted to hold the molding 2 but it is to be recognized that clip 1 may hold the molding on other motor vehicles and surfaces.

Figure 4:
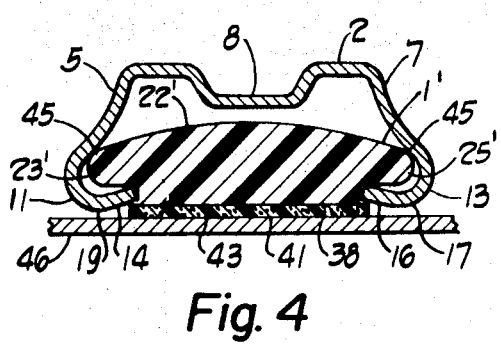
FIG. 4 is a transverse sectional view, similar to FIG. 2 showing another clip embodying this invention, together with a molding to be held thereby, mounted on a surface.
Figure 5:
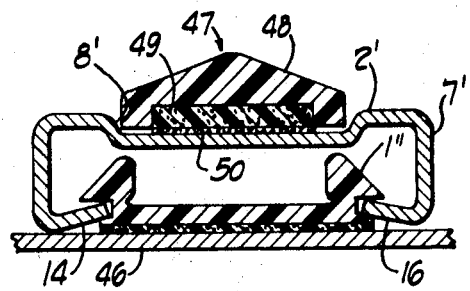
FIG. 5 is a transverse sectional view, similar to FIG. 2, of a clip embodying another form of this invention, together with a molding to be held thereby.

Further, while clip 1 is shown together with a molding 2 which is metal, it may be used and is adapted to function with other metal moldings having different exterior surfaces and configurations as shown, by way of further example, in FIG. 4, as well as with metal moldings which are decorated with feature stripes including feature strips of plastic such as shown in FIG. 5 and described and claimed in U.S. patent application, Ser. No. 601,473 of which this application is a continuation-in-part and with moldings of other material. It is only necessary that the molding with which clip 1 is used have the necessary interior (in the sense of not being visible when mounted in use) structure to receive and co-act with the clip of and in accordance with the teachings and principles of this invention.

To this end, molding 2 is formed of metal or other suitable material and includes a body member 5 having an outer surface 7, which may, as noted, have any desired configuration having a pleasing or decorative appearance. Surface 7 has a longitudinally extending groove 8 in which a feature strip 10, which may complement or contrast the color of the surface upon which the molding is to be used, may be painted, if desired.

In addition, the body member 5 has two parallel, spaced re-entrant portions 11 and 13 which are disposed near the surface upon which the molding is mounted and provide interior flanges 14 and 16 for co-action with the clip 1, when the clip is mounted therein. Further the re-entrant portions 11 and 13 may bulge toward or be disposed nearer, as at 17 and 19, the surface upon which the molding is mounted, when it is mounted (see FIG. 1, for example), than the flanges 14 and 16, in order to cover and conceal the edges of the clip 1. Under such circumstances, the relationship of the molding 2 and clip 1 is preferably such that the bulges 17 and 19 do not actually engage the surface upon which the molding is mounted, but are positioned very closely thereto, within a matter of a few thousandths of an inch, so that water and rain may flow or seep beneath and out from under the molding as it (the water) flows downwardly and runs off the surface upon which the molding is mounted. Further, clip 1 and molding 2 engage each other so that they do not have relative motion in a direction perpendicular to the surface upon which the molding is to be mounted and thus the molding is held firmly in place on and relative to the mounting surface.

Broadly, clip 1, embodying a preferred form of this invention has means, on the one hand, for engaging and interacting with the molding 2 and means, on the other hand, for securing the clip and, thereby, the molding to the motor vehicle or surface upon which the molding is to be mounted, without requiring apertures therein, which means holds and retains the molding in position despite temperature and weather changes and/or vibrations due to operation of the vehicle.

To this end clip 1 includes a body member 22 having two flanges 23 and 25 which extend outwardly from body member 22 and have flat, inner, relative to the surface upon which the clip is to be mounted, surfaces 26 and 28 which are positioned and sized to co-act with the flanges 14 and 16, respectively, of the molding 2.

The engagement between the flanges 23 and 25 and the flanges 14 and 16, respectively, retains the molding on the clip.

Figure 2:
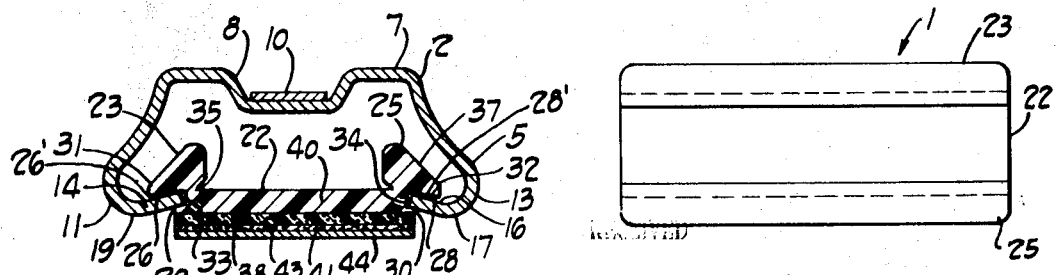
FIG. 2 is a transverse sectional view, on an enlarged scale, of the molding shown in FIG. 1, taken through a clip embodying this invention.
Figure 3:
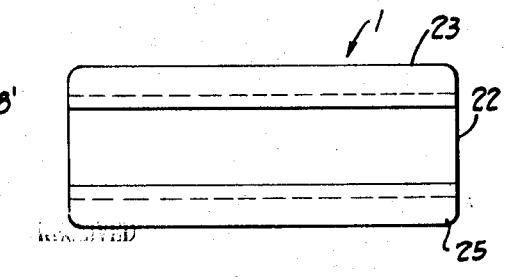
FIG. 3 is a plan view of the clip shown in FIG. 2.

Further, to increase the holding action of the flange surfaces 26 and 28 of flanges 23 and 25, respectively, conveniently have a downwardly and outwardly slant or angle, as viewed in FIG. 2, and the adjacent surfaces 26' and 28' of flanges 14 and 16 have a complementary upwardly and inwardly slant or angle.

Also, this invention includes means by which clip 1 and molding 2 are precluded from having relative motion therebetween in a direction perpendicular to the surface upon which the molding is to be mounted. As noted, the engagement between flanges 23 and 25 and 14 and 16, respectively, prevents motion tending to separate the clip and molding. In order to prevent relative motion in the other direction body member 22, also includes lips 29 and 30 which are disposed in spaced relation with flanges 23 and 25, respectively, and adapted to engage the flanges 14 and 16, respectively, of molding 2 on the side remote from surfaces 26' and 28', respectively, and so prevent the molding and clip from displacing inwardly relative to each other, or, more particularly, prevent the molding 2 from displacing toward the mounting surface when the same is mounted thereon by the clip.

Broadly, it is within the scope of this invention to position the clip within the molding in any desirable manner.

Preferably, as shown in FIG. 1, body member 22 of clip 1 and/or flanges 14 and 16 of molding 2, is provided with structure and means whereby the molding may be snapped over the clip, or the clip snapped within the molding, thereby obviating the need to insert the flanges of the clip into the molding at the end thereof and slide the clip along the molding to the desired position.

Accordingly, in a preferred form of this invention, one or both of flanges 23 and 25 are adapted to bend inwardly or toward the other said flange in response to pressure exerted thereon, so that the ends or tips 31 and 32 of the flanges 23 and 25, respectively, are spaced apart a distance less than the distance between the near ends or tips 33 and 34 of flanges 14 and 16, respectively.

In order to facilitate the inward (toward each other) bending of flanges 23 and 25, each said flange is preferably provided with a relief 35, adjacent body member 22 so that, in the preferred form of the invention, the juncture between the flanges, respectively, and the body member functions as a spring or hinge means biased toward the at rest position shown in the drawings.

To obtain the full benefit of the biased hinge means structure of this invention, each flange having such hinge means is, also, preferably provided with a camming surface 37 which responds to displacement against or pressure from engagement with the adjacent flange, 14 or 16, as the case may be, of the molding to cause the clip flange of which it is a part to bend or rotate about its juncture with the body member until the tip of the clip flange, 32, for example, passes the tip of the molding flange, 34, for example, at which instance the clip flange springs back into its at rest position and interengages with and holds the molding. In practice, the clip and molding may be tipped, relative to each other, to interengage one pair of flanges, 14 and 23, for example then the clip may be snapped into place by bringing the other two flanges, 16 and 25, for example, into engagement and pushing them together to take advantage of the camming action as described above.

Clip 1 also includes adhesive means for engaging and adhering to the surface upon which the molding is to be mounted in order to hold the molding in place. Such means preferably is adapted to hold the molding in position even though the surface upon which the clip is mounted be subject to vibration, shocks and the like. To this end, clip 1 also preferably includes a cushion member 38 which is adapted to be disposed between the body member 22 and the mounting surface, as by adhesion to the flat or back surface 40 of the body member. The structure and function of cushion member 38, which is preferably at least about $\frac{1}{32}''$ thick, is in accordance with the disclosure of the application of which this application is a continuation-in-part.

In order to adhere the clip to the mounting surface, adhesive means, preferably a pressure sensitive adhesive, 41, is provided on the surface 43 of cushion member 38 remote from the surface 40 of body member 22.

Adhesive 41 is, in turn, conveniently protected when necessary, during handling and storage of clip 1 by a detachable or removable backing strip 44, which is removed when the clip is to be adhered to the mounting surface.

Another clip embodying this invention is shown in FIG. 4, and indicated generally at 1' together with a molding 2 which is mounted thereby and a portion of the surface 46 upon which it is mounted. In FIG. 4, like reference characters refer to like parts as in FIG. 2. FIG. 4 also depicts schematically the relationship, described above, between the position and thickness of the clip and molding viz-a-viz the surface upon which the same are mounted, whereby water, rain and other liquids may flow off the surface by passing beneath the molding.

In FIG. 4 the molding 2 is shown as being the same as the molding in FIG. 2, but it is to be understood that any clip embodying this invention may be used with any desired molding having the necessary structure to co-act with the clip and any molding having the necessary structure to co-act therewith may be used with any clip embodying this invention.

In this instance, clip 1' has a body member 22' having flanges 23' and 25' which are not flexibly or hingedly connected with the body member but which otherwise co-act with the flanges of the molding 2 in the same manner and to the same purpose as the flanges 23 and 25 of clip 1. Since flanges 23' and 25' cannot flex inwardly toward each other or otherwise to pass between the flanges 14 and 16 of the molding 2, clip 1' is positioned within the molding by inserting flanges 23' and 25' in the end of the molding and sliding the clip along, with the flanges 14 and 23' and 16 and 25', respectively interengaged to the desired position.

Also, in this instance relative motion between the clip 1' and molding 2 is prevented, not only by the engagement between the flanges 14 and 23' and 16 and 25', respectively, but, also, by engagement between the body 22' of the clip 1' and the body 5 of the molding 2, as at 45, and to which end body 22' of the clip 1' is made sufficiently large to fill at least a portion of the interior of the molding.

The form of clip, 1" shown in FIG. 5, wherein like reference characters refer to like parts as in FIG. 2, is similar in structure to the clip 1, except that in this instance no cushion member is provided between the surface 40 of body member 22 and the adhesive 41 and the clip is shown in use with a molding 2' having an outer surface 7' with a groove 8' therein in which a separate feature strip 47 is disposed. As shown, strip 47 comprises a plastic body member 48, a cushion member 49 adhered thereto and a pressure sensitive adhesive 50 by which strip 47 is adhered to the surface of and within groove 8'. Strip 47 may take any exterior or shape and color as is desired or found by the user to enhance the overall appearance of the molding 2'.

Also, surface 7' is shown with a more rectangular shape than the surface 7 of molding 2, but, as noted above, this is a matter of choice so long as the interior structure of the molding has the necessary shape and structure to receive and co-act with the clip embodying this invention.

Figure 6:
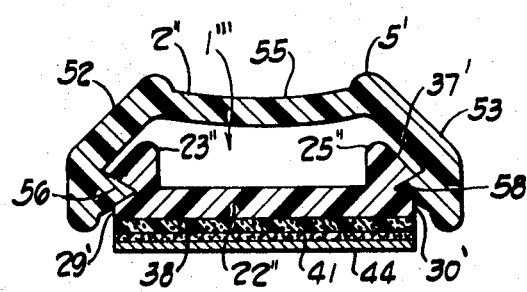
FIG. 6 is a transverse sectional view, similar to FIG. 2, of a clip embodying another preferred form of this invention.

In the preferred form of the invention shown in FIG. 6, like reference characters refer to like parts as in FIG. 2. The molding 2" has a body 5'. Body 5' is bifurcated, having two depending leg members 52 and 53 which diverge and extend away from each other in a direction toward the mounting surface or backing strip. Leg members 52 and 53 are flexible and resilient relative to the connecting portion 55 of the body 5' and each is provided, near its free extremity, with a lip or flange, 56 and 58, respectively, which extends inwardly relative to the interior of the molding.

In order to retain the clip 1''' in the molding and prevent relative displacement or movement therebetween, body member 22" is bifurcated at each side (relative to the length of the molding to be held thereby) having flanges or legs 23" and 29' and 25" and 30' which engage on either side of the lips or flanges 56 and 58, respectively.

In this instance clip 1''' may be assembled within and on the molding by canting body member 22" to engage flanges 23" and 29', for example, about or on flange 56 and the clip and molding are then pressed together, lip 58 camming on the surface 37' of flange 25" to bend or flex leg 53 outwardly until the flange 58 passes the tip of flange 25" and snaps into the seat defined by flanges 25" and 30'. When thus seated, molding 2" is held in position and against relative movement therebetween by clip 1'''.

Modifications, changes and improvements to the forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:

1. A clip for holding an elongated molding substantially permanently on a vehicle body or other surface, said clip having a body member of relatively short length relative to the length of the molding to be retained thereby, flange means on said body member for engaging and interlocking with said molding, a vibration absorbing cushion member on said body member, and adhesive means on said cushion member for adhering said clip to the surface upon which said molding is to be mounted, whereby said vibration absorbing cushion means is disposed between said clip body member and the surface upon which said clip is mounted, said adhesive means being protected against adhering to undesired surfaces during storage and handling.

2. The clip according to claim 1 in which said clip holds said molding in closely spaced relation with said surface upon which said molding is to be mounted.

3. The clip according to claim 1 in which said adhesive means is a pressure sensitive adhesive and said clip includes a detachable backing strip covering and protecting said pressure sensitive adhesive.

4. The clip according to claim 1 in which said flange means are formed integrally with said body member and engage within the molding to be held thereby, and at least one said flange means is flexible and resilient with respect thereto and is flexed and bent to permit entry into the molding to be held thereby.

5. The clip according to claim 4 in which said clip has a longitudinally extending center and at least one flange means flexible and resilient with respect to said body member has a camming surface thereon, engagement of said camming surface with and against the molding to be mounted by said clip bending and flexing said last-named one flange means inwardly relative to said center whereby said last-named one flange means enters into said molding.

6. The clip according to claim 4 in which at least one said flange means, flexible and resilient with respect to said body member, has a first portion extending angularly from said body member and in a direction to be away from the surface upon which said clip is to be mounted and a second portion extending angularly relative to said first portion and in a direction away from other said flange means and said last-named one flange means flexes and bends relative to said body member at the juncture of said first portion therewith.

7. The clip according to claim 6 in which said first portion of said last-named one flange means has a relief adjacent said body member and on the side opposite said second portion forming hinge means whereby said last-named one flange means bends and flexes inwardly toward the other said flange means.

8. The clip according to claim 7 in which said second portion of said last-named one flange means has a camming surface thereon, engagement of said camming surface with said molding bending and flexing said last-named one flange means about said relief and toward said other flange means.

9. The clip according to claim 1 in which said body member has two sides parallel to the length of the molding to be held thereby, and said flange means comprises a pair of flanges at each said side spaced apart and providing a seat for the reception of a complementary lip or flange of the molding to be held thereby.

10. The clip according to claim 9 in which one said flange of each said flange means has a camming surface remote from said seat for engagement with said flange or lip of the molding to be held by said clip to displace a portion of said molding relative to said clip and over said one flange and into said seat.

11. The clip according to claim 10 in which said one flange of said clip has a substantially rigid connection with said body member of said clip and said camming surface induces a resilient bending of one portion of the molding relative to another portion to seat the same.

12. In the combination of an elongated molding and a clip for mounting said molding on a vehicle body or other surface wherein said molding has a decorative outer surface and a hollow interior with and defined at least in part by spaced, inturned flanges, the improvement that said clip has a body member of relatively short length relative to the length of said molding flange means on said body member for engaging and interlocking with said molding flanges, a vibration absorbing cushion member on said body member, and adhesive means on said cushion member for adhering said clip to the surface upon which said molding is to be mounted, whereby said vibration absorbing cushion means is disposed between said clip body member and the surface upon which said clip is mounted.

13. The combination according to claim 12 in which said clip holds said molding in closely spaced relation with said surface upon which said molding is to be mounted.

14. The combination according to claim 12 in which said flange means are formed integrally with said body member and engage within said molding, and at least one said flange means is flexible and resilient with respect to said body member and is flexed and bent to permit entry into said molding.

15. The combination according to claim 14 in which said clip has a longitudinally extending center and at least one flange means flexible and resilient with respect to said body member has a camming surface thereon, engagement of said camming surface with and against the molding to be mounted by said clip bending and flexing said one flange means with a camming surface inwardly relative to said center whereby said one flange means with a camming surface enters into said molding.

16. The combination according to claim 14 in which at least one said flange means flexible and resilient with respect to said body member has a first portion extending angularly from said body member and in a direction to be away from the surface upon which said clip is to be mounted and a second portion extending angularly relative to said first portion and in a direction away from other sand flange means and said last-named one flange means flexes and bends relative to said body member at the juncture of said first portion therewith.

17. The combination according to claim 16 in which said first portion of said last-named one flange means has a relief adjacent said body member and on the side opposite said second portion forming hinge means whereby said last-named one flange means bends and flexes inwardly toward the other said flange means.

18. The combination according to claim 17 in which said second portion of said last-named one flange means has a camming surface thereon, engagement of said camming surface with said molding bending and flexing said last-named one flange means about said relief and toward said other flange means.

19. The combination according to claim 12 in which said adhesive means is a pressure sensitive adhesive.

20. The combination according to claim 19 with a backing strip detachably covering said pressure sensitive adhesive.

21. The combination according to claim 19 and a surface upon which said combination is mounted and held by engagement of said pressure sensitive adhesive therewith.

22. The combination according to claim 12 in which said body member has two sides parallel to the length of the molding to be held thereby, and said flange means is formed integrally with said body member, engages within the molding to be held thereby and comprises a pair of flanges at each said side spaced apart and providing a seat for the reception of a complementary lip or flange of said molding.

23. The combination according to claim 21 in which one said flange of each said flange means has a camming surface remote from said seat for engagement with said flange or lip of said molding to displace a portion of said molding relative to said clip and over said one flange and into said seat.

24. The clip according to claim 23 in which said one flange of said clip has a substantially rigid connection with said body member of said clip and said camming surface induces a resilient bending of one portion of the molding relative to another portion to seat the same.

References Cited

UNITED STATES PATENTS

| | | | |
|---|---|---|---|
| 1,979,691 | 11/1934 | Jackson | 161—178 |
| 2,226,615 | 12/1940 | Killen | 49—462 |
| 2,734,765 | 2/1956 | Henderson et al. | 293—62 |
| 2,959,146 | 11/1960 | Erkert | 114—219 |
| 3,019,758 | 2/1962 | Erkert | 114—219 |
| 3,131,960 | 5/1964 | Popp | 293—1 |
| 3,439,950 | 4/1969 | Kunevicius | 293—62X |

ARTHUR L. LA POINT, Primary Examiner

H. BELTRAN, Assistant Examiner

U.S. Cl. X.R.

49—462; 52—718; 114—219; 161—178; 293—62, 99